United States Patent [19]

Goettel

[11] 4,050,091
[45] Sept. 20, 1977

[54] MANUALLY-CONTROLLED PNEUMATICALLY-ACTUATED ELECTRIC MOTOR STARTER SYSTEM

[76] Inventor: John H. Goettel, 27279 S. Gribble Road, Canby, Oreg. 97013

[21] Appl. No.: 719,961

[22] Filed: Sept. 2, 1976

[51] Int. Cl.² .......................................... H02H 7/085
[52] U.S. Cl. ........................................ 361/31; 361/116
[58] Field of Search ............... 361/31, 29, 116, 22, 361/23; 60/DIG. 2; 200/82 R, 82 B; 290/1, 7, 40 R

[56] References Cited

U.S. PATENT DOCUMENTS

| | | | |
|---|---|---|---|
| 2,078,784 | 4/1937 | Willheim | 361/2 X |
| 2,562,847 | 7/1951 | Spencer | 92/48 |
| 3,073,931 | 1/1963 | Leeds | 200/82 B X |
| 3,083,277 | 3/1963 | Tsutsui et al. | 200/82 B |
| 3,816,800 | 6/1974 | Ringler et al. | 361/116 X |

Primary Examiner—J D Miller
Assistant Examiner—Patrick R. Salce
Attorney, Agent, or Firm—Chernoff & Vilhauer

[57] ABSTRACT

A manually-controlled, pneumatically-actuated electric motor starter and overload protection system wherein actuation and automatic overload protection are accomplished wholly pneumatically without any electromagnetic actuating circuitry so as to render the system more reliable and shockproof regardless of age or deterioration.

6 Claims, 1 Drawing Figure

MANUALLY-CONTROLLED PNEUMATICALLY-ACTUATED ELECTRIC MOTOR STARTER SYSTEM

SUMMARY OF THE INVENTION

The system comprises an electric motor supplied with current by multiple electric conduits, in each of which is interposed a respective electrical switch which controls the supply of current. A spring-biased pneumatic cylinder moves the switches in unison to ther conductive positions in response to a gas charge above a predetermined pressure, and the spring moves the switches in unison to their nonconductive positions upon reduction of the pressure of the gas charge to below such pressure. The gas charge is supplied through a gas conduit by a compressor to insure the necessary rapid response of the switches and thereby minimize arcing and provide for continuous motor operation if desired. Interposed in series in the gas conduit are multiple pneumatic overload valves each responsive to a respective overload sensing device in the various electrical conduits. The overload valves permit exposure of the pneumatic cylinder to a high pressure gas charge from the compressor if the electrical current flow in each of the conduits is below a predetermined current flow, and reduce the pressure of the charge to below the level necessary to keep the switches in their conductive positions if the electrical current flow in any one of the electrical conduits is greater than a predetermined current flow. A manually-operable pneumatic valve is interposed in the gas conduit in series with the multiple overload valves for selectively permitting the exposure of the pneumatic cylinder to a high-pressure gas charge sufficient to actuate the switches to their conductive positions, or alternatively to reduce the pressure of the gas charge sufficiently to open the switches. The manually-operated pneumatic valve is separated from both the pneumatic cylinder and the overload valves by an electrically nonconductive portion of the gas conduit.

BACKGROUND OF THE INVENTION

The present invention relates to improvements in manually-operated electric motor starter and overload protection systems, and particularly to the elimination of all electromagnetic circuitry therein and resultant improvement in safety and reliability.

Conventional electric motor starter systems characteristically feature solenoid-operated switches in the main power conduits. Operator control is accomplished by means of relatively low current, manually-operated electric switches which selectively energize or de-energize the solenoids through an electromagnetic actuating circuit. Each main power conduit has a conventional overload sensing relay which de-energizes the electromagnetic circuitry if an overload is sensed.

The problems with such electromagnetically-actuated motor starter systems are twofold. First, particularly with respect to electric motors which are not normally continuously running but rather require frequent switching for momentary operation, the electromagnetic components tend to wear and deteriorate too rapidly, causing excessive down time and repairs. Second, deterioration of the electromagnetic components such as the solenoid and overload relays tends eventually to result in current leaks from the main motor power circuitry into the electromagnetic control circuitry and thence to the manually-operated control switches, resulting in severe hazards to the operator from electric shocks.

Switching systems such as those shown in Willheim U.S. Pat. No. 2,078,784 and Spencer U.S. Pat. No. 2,562,847 have been devised utilizing actuating circuitry which combines electromagnetic and pneumatic principles. However such systems merely reduce reliability and add expense by retaining the electromagnetic circuitry and adding a second pneumatic circuit to it. Moreover when pneumatic actuators are used, as in Willheim, the application of gas pressure conventionally opens the switches rather than closing them, causing the switches to be closed if the source of pressurized gas fails. This practice is not acceptable for application to electric motor control systems since the failure of power in the actuating circuit must result in stoppage of the motor for safety reasons. Further, such systems as that shown by Spencer are not adaptable for application to continuously running motors because of the requirement for continuous hand pressure to close the main switches.

Accordingly a need exists for a manually-controlled electric motor starter and overload protection system which completely eliminates all electromagnetic actuating circuitry and thereby renders the system more durable and reliable, requires less repair, removes all danger of high current leakage and resultant shock to the manual operator, is adaptable for both momentary and continuous running of motors and results in motor stoppage if a power failure occurs in the actuating circuitry.

SUMMARY OF THE PRESENT INVENTION

The present invention is directed to an improvement in manually-operated electric motor starter systems which overcomes the above-described disadvantages and satisfies the foregoing needs by eliminating all electromagnetic actuating and overload protection circuitry, and providing in its place manually-controlled pneumatic actuation and automatic pneumatically-actuated overload protection by the utilization of a gas compressor-fed pneumatic circuit employing electrically nonconductive gas conduits. An electric motor is supplied with current through multiple electrical conduits, each having an electrical switch for selectively conducting or interrupting the supply of current to the motor. A pneumatic actuating cylinder moves the switches in unison to their conducting positions when exposed to a gas charge supplied from a compressor at a pressure above a predetermined level. Spring-biasing means associated with the cylinder and switches moves the switches in unison to positions interrupting the flow of current whenever the pressure of the gas charge falls below the predetermined pressure necessary to counterbalance the spring-biasing force. The gas charge is supplied through a gas conduit by a compressor to insure the necessary rapid response of the switches to minimize arcing, and to provide for continuous motor operation if necessary by providing a continuous high-pressure gas charge without requiring the continued presence of the operator. Multiple pneumatic overload valves are interposed in series in the gas conduit, each responsive to a respective overload sensing device in each of the electrical conduits. The overload valves permit exposure of the pneumatic cylinder to a high pressure gas charge from the compressor if the electrical current flow in each of the conduits is below a predetermined current flow, and reduce the pressure of the charge to below the level necessary to keep the switches in their conductive positions if the electrical current flow in any one of the electrical conduits is greater than the predetermined current flow. A manually-operable pneumatic valve is interposed in the gas conduit in series with the multiple overload valves for selectively permitting the exposure of the pneumatic cylinder to a high pressure gas charge sufficient to actuate the electrical switches to their conductive positions, or alternatively to reduce the pressure of the gas charge sufficiently to open the switches under the aforementioned spring-biasing force. The manually-operated valve may be either of the spring-biased type whereby continuous manual force is necessary to expose the pneumatic cylinder to a high pressure gas charge (for momentary operation of the electric motor operation), or of a stable two-position type wherein no such continuous manual force is necessary to maintain the supply of a high pressure gas charge to the pneumatic cylinder (for unattended continuous operation of the electric motor). The manually-operated pneumatic valve is separated from both the pneumatic cylinder and the overload valves by an electrically nonconductive portion of the gas conduit. In the preferred embodiment the manually-operated valve is located remote from a frame, preferably enclosed, which mounts the pneumatic cylinder and overload valves. The manually-operated valve is separated from the frame by the electrically nonconductive portion of the gas conduit. In such embodiment another electrically nonconductive portion of the gas conduit extends from the remote manually-operated pneumatic valve to the frame where it couples with a gas feed line leading from the compressor.

It is therefore a primary objective of the present invention to provide a manually controlled electric motor starter system having an actuation and overload protection circuit which is solely pneumatic and without electromagnetic components, thereby rendering the system more durable and reliable.

It is a further primary objective of the present invention to provide such a system which removes all danger of high current leakage and resultant shock to the manual operator by separating all manually-operated pneumatic valves by electrically nonconductive gas conduits from all pneumatic circuit components which are connected to the main motor electrical power conduits.

It is a further objective of the present invention to provide such a system which is adapted for both momentary and unattended continuous running of electric motors by the utilization of a compressor to provide pressurized gas to the pneumatic actuating and overload protection circuitry.

It is a further objective of the present invention to provide such pneumatic actuation in a manner such that failure of power in the actuating circuitry, in the form of failure of the pressurized gas supply, results in interruption of power to the electric motor.

The foregoing and other objectives, features and advantages of the present invention will be more readily understood upon consideration of the following detailed description of the invention taken in conjunction with the accompanying drawing.

BRIEF DESCRIPTION OF THE DRAWING

The single FIGURE is a schematic diagram of an illustrative embodiment of the electric motor starter and overload protection system, depicting the circuitry applicable to a reversible three-phase electric motor intended for momentary operation.

DESCRIPTION OF THE PREFERRED EMBODIMENT

Figure 1:
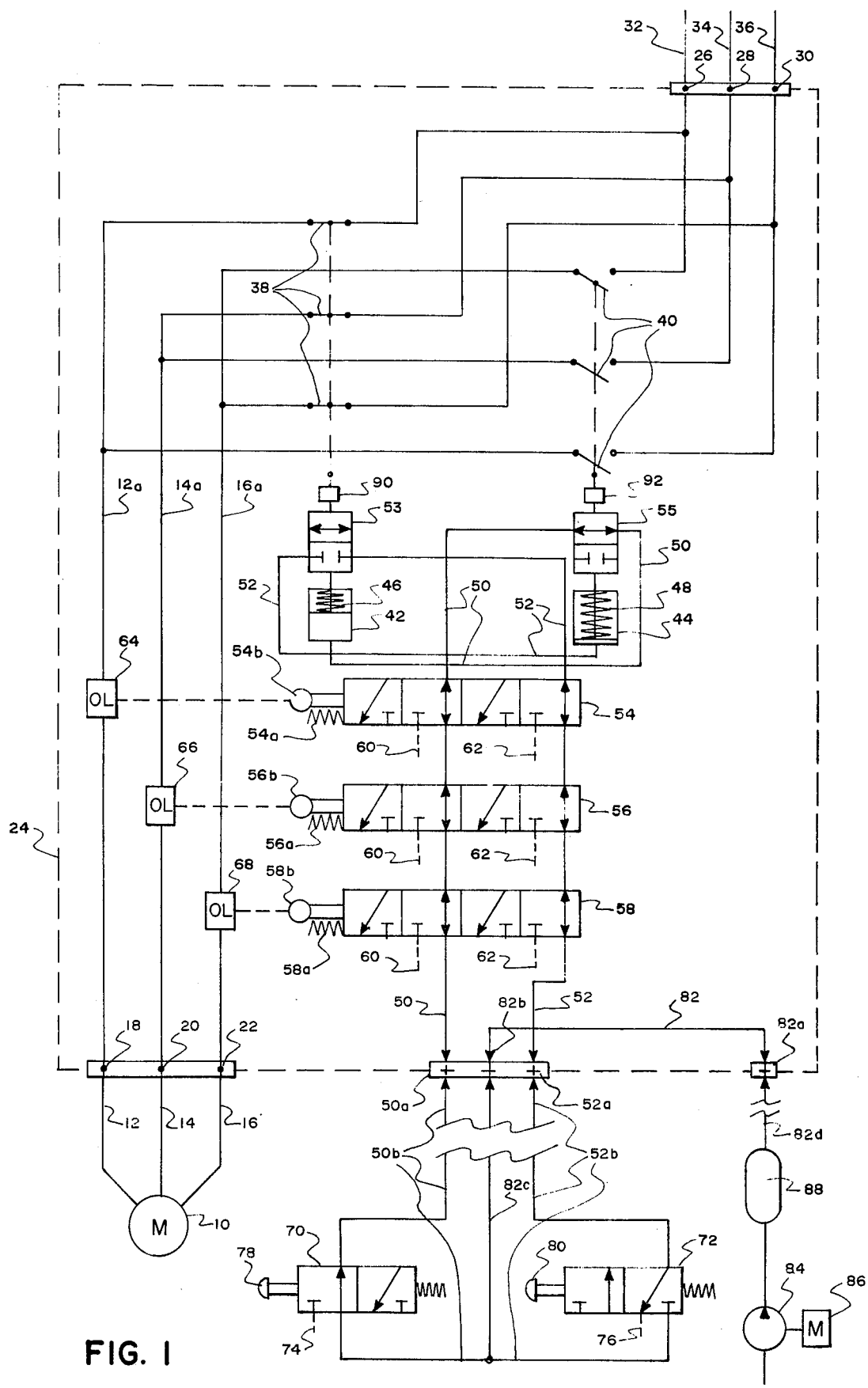

In the FIGURE, a three-phase electric motor 10 is supplied with electrical current through multiple electrical conduits 12, 14 and 16, which are detachably connected by connectors 18, 20 and 22 to extensions 12a, 14a and 16a of the respective electrical conduits mounted on an enclosed frame 24. The conduit extensions 12a, 14a and 16a extend through the enclosure 24 by two different parallel routes as shown in the figure for bi-directional operation of the motor 10, and terminate in connectors 26, 28 and 30 which detachably connect the respective electrical conduit extensions to main power supply lines 32, 34 and 36. Interposed in each of the parallel branches of the set of electrical conduit extensions 12a, 14a and 16a is a respective set of multiple electrical switches 38 and 40, each having a conductive and a nonconductive position for controlling actuation of the motor 10 in a respective direction, and being movable in unison from one position to the other by a respective pneumatic actuating cylinder 42 and 44. As shown in the figure, the switches 38 are in their conductive positions, while the switches 40 are in their nonconductive positions.

Each pneumatic cylinder 42 and 44, together with the electrical switches 38 and 40 which they control, are likewise mounted on the frame 24. Each cylinder 42 and 44 contains a spring 46 and 48 respectively which biases the cylinders to positions wherein the switches 38 and 40 are in their nonconductive, open positions. In order therefore to move either set of switches 38 or 40 to its conductive or closed position, the respective pneumatic cylinder 42 or 44 must be exposed to a gas charge through a respective gas conduit 50 or 52 having a pressure greater than a predetermined pressure necessary to overcome the biasing force of the respective cylinder spring 46 or 48. The predetermined pressure necessary to overcome the respective springs 46 and 48 may be the same or they may be different. In any case, if the pressure of the gas charge to which the respective pneumatic cylinder is exposed, through conduit 50 or 52, is less than the predetermined pressure necessary to overcome the biasing force of the respective spring 46 or 48, the spring will push the piston of the pneumatic cylinder 42 or 44 to a position opening the respective electrical switches 38 or 40 thereby interrupting the flow of current to the motor 10.

Interposed in each of the gas conduits 50 and 52 is a two-position valve 55 and 53 respectively whose position is determined by the position of the piston rod of the respective cylinder 42 or 44 which is opposite to that supplied by the gas conduit in which the valve is located. The valves provide a pneumatic interlock which prevents the closure of one set of electrical switches while the other set is closed by preventing the exposure of one cylinder to a pressurized gas charge (for example cylinder 44 as shown in the figure while the other cylinder is so exposed.

Interposed in series in the respective gas conduits 50 and 52 is a set of multiple overload valves 54, 56 and 58, each having a first position as shown in the figure whereby the conduction of a gas charge through the respective conduits 50 and 52 is permitted, and a second position (by movement of each valve toward the right) wherein the transmission of a gas charge through the conduits 50 and 52 is blocked and the gas charge in the pneumatic cylinder 42 or 44 is relieved through a relief port 60 or 62 respectively. A biasing spring, 54a, 56a and 58a respectively, tends to move each overload valve 54, 56 and 58 to its second position preventing the transmission of a gas charge to the respective pneumatic cylinders. Each valve 54, 56 and 58 is mechanically connected to one of a plurality of overload sensing devices 64, 66 and 68, such as bimetallic strips, each interposed in a respective one of the electrical conduit extensions 12a, 14a and 16a respectively, for sensing the presence of a current flow greater than a predetermined current flow. If the predetermined current flow in any one of the conduit extensions 12a, 14a and 16a exceeds the predetermined current flow, the overload sensing device mechanically trips its respective overload valve 54, 56 or 58 permitting it to move under the influence of the spring to its second position, thereby interrupting supply of any gas charge through conduit 50 or 52 to the respective pneumatic cylinder and simultaneously relieving the pressure of the gas charge previously supplied to the respective cylinder. The relief of the gas pressure allows the respective cylinder biasing spring 46 or 48 to move the respective set of switches 38 or 40 to their nonconductive positions thereby interrupting current flow to the motor 10. Alternatively, if the current flow in each of the conduit extensions 12a, 14a and 16a is below the predetermined current flow, all of the overload valves 54, 56 and 58 are retained mechanically in their first positions by resettable catches 54b, 56b and 58b unless one of the catches is tripped by one of the overload sensing devices.

The overload valves 54, 56 and 58, the respective overload sensing devices 64, 66, and 68 and the gas conduits 50 and 52 are also mounted on the frame 24. Preferably the gas conduits 50 and 52 have quick-disconnect couplings 50a and 52a emerging from the frame 24. To these couplings are attached electrically nonconductive portions 50b and 52b respectively of gas conduits 50 and 52, constructed of an electrically nonconductive substance such as neoprene. Interposed in each of the electrically nonconductive portions of the respective gas conduits in series with the overload valves 54, 56 and 58 are respective manually-operated pneumatic valves 70 and 72 each having a first position (as shown with respect to valve 70) permitting the supply of a gas charge through the conduits 50b or 52b and through the overload valves 54, 56 and 58 to the pneumatic cylinders 42 or 44 respectively, and having a second position (as shown with respect to valve 72) interrupting the supply of such gas charge and relieving the pressure of the gas charge previously supplied to the respective cylinders through a respective relief port 74 or 76. In the second position such relief would cause opening of the respective set of switches 38 or 40 under the biasing force of the respective cylinder spring 46 or 48.

As shown in the figure, each of the manually-operated valves 70 and 72 is spring-biased to its second position and requires manual pressure on a pushbutton 78 or 80 respectively to move the valve to its first position. This is because the motor 10 is intended only for momentary running accompanied by the attention of the operator. Were the motor 10 intended for continuous unattended operation, the manually-operated valves 70 and 72 would preferably be unbiased and lever operated so as to be stable in either of the two valve positions. This would permit each manually-operated valve to remain in its first position indefinitely without the presence of an operator.

A continuous gas charge at a pressure higher than the pressure necessary to overcome the biasing force of the cylinder springs 46 and 48 respectively is supplied to each of the manually-operated valves 70 and 72 through a parallel connection from a common gas feed conduit 82, which receives gas at above such predetermined pressure from a gas compressor 84 driven by a motor 86. An accumulator 88 is preferably included in the gas feed conduit to store sufficient pressurized gas to permit only intermittent operation of the compressor 84. Preferably the gas feed conduit extends from the compressor 84 to the frame 24, where it is connected through quick-disconnect couplings 82a and 82b to an electrically nonconductive portion 82c which extends from the frame 24 to the parallel connection with the manually-operated valves 70 and 72. The electrically nonconductive portions 50b, 52b and 82c of the gas conduit circuitry are preferably of substantial length so that the manually-operated valves 70 and 72 are located remote from the frame 24 and the pneumatic and electrical components mounted thereon, so as to remove all possibility of physical, as well as electrically conductive, contact between the operator and the main electrical power supply circuit, pneumatic cylinders, overload valves and frame upon which they are mounted in adjacent relationship. In any case, all electrically conductive connection between the manual valves 70 and 72 and the remainder of the system is removed by the electrically nonconductive portions of the gas conduit circuitry. Ideally the portion of the gas feed conduit 82d leading from the compressor toward the frame 24 is also electrically nonconductive to prevent any other dissemination of possible current leaks through the frame 24.

It may be that, if the manually-operated valves 70 and 72 are located a substantial distance from the frame 24, there will be substantial line losses in the pressure of the gas between the manually-operated valves and the cylinders 42 and 44, which might cause slow movement of the cylinders in response to a pressurized gas charge, thereby tending to cause harmful arcing. In such cases this problem can be overcome by utilizing a conventional spring-loaded, snap-action over-center toggle mechanism (indicated schematically as 90 and 92), similar to that utilized in the past in ordinary household light switches to accomplish an instantaneous movement of the electrical contact points irrespective of the speed at which external actuating force is applied.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A manually-controlled, pneumatically actuated electric motor starter and overload protection system comprising:
   a. an electric motor;
   b. multiple electrical conduits connected to said motor for supplying electrical current thereto;
   c. multiple electrical switch means, each interposed in a respective one of said electrical conduits, for selectively permitting or interrupting the flow of said current therethrough;
   d. pneumatic actuating means connected to said multiple switch means for moving said multiple switch means in unison to positions permitting the flow of said current through said multiple conduits in response to the exposure of said pneumatic actuating means to a gas charge at a pressure above a predetermined pressure level;

e. biasing means associated with said pneumatic actuating means and said multiple switch means for moving said multiple switch means in unison to positions interrupting the flow of said current through said multiple conduits in response to the reduction of the pressure of said gas charge to below said predetermined pressure level;

f. motor-driven gas compressor means for supplying said gas charge at a pressure above said predetermined pressure level to said pneumatic actuating means;

g. gas conduit means for conveying said gas charge from said compressor means to said pneumatic actuating means;

h. multiple overload sensing means, each interposed in a respective one of said multiple electrical conduits, for sensing the presence of a current flow in any one of said electrical conduits greater than a predetermined current flow;

i. multiple pneumatic overload valve means interposed in series in said gas conduit means between said pneumatic actuating means and said compressor means, each of said pneumatic overload valve means being connected to a respective one of said overload sensing means, for selectively permitting the exposure of said pneumatic actuating means to said gas charge at said pressure above said predetermined pressure level in response to the electrical current flow in each of said electrical conduits, as sensed by said multiple overload sensing means, being below said predetermined current flow, or for selectively reducing the pressure of said gas charge to below said predetermined pressure level in response to the electrical current flow in any one of said electrical conduits, as sensed by any one of said overload sensing means, being greater than said predetermined current flow; and j. manually-operable pneumatic valve means interposed in said gas conduit means between said pneumatic actuating means and said compressor means and in series with said multiple overload valve means for selectively permitting the exposure of said pneumatic actuating means to said gas charge at said pressure above said predetermined pressure level or reducing the pressure of said gas charge to below said predetermined pressure level, the portion of said gas conduit means between said manually-operable pneumatic valve means and said pneumatic actuating means being electrically nonconductive.

2. The system of claim 1 wherein the portion of said gas conduit means between said manually-operable pneumatic valve means and said respective overload valve means is electrically nonconductive.

3. The system of claim 1 wherein said elements (b) through (e) inclusive, (h) and (i) are all mounted on a frame adjacent to one another, and wherein said elements (f) and (j) are positioned remote from said frame, said electrically nonconductive portion of said gas conduit means being located between said manually-operable valve means and said frame.

4. The system of claim 3 wherein said manually-operable valve means has first and second ports and said electrically nonconductive portion of said gas conduit means extends between said frame and said first port, further including a second electrically nonconductive portion of said gas conduit means extending from said second port of said manually-operable valve means toward said frame, and a third portion of said gas conduit means extending from said gas compressor means toward said frame and connected adjacent said frame to said second electrically nonconductive portion of said gas conduit means.

5. The system of claim 1 further including second multiple electrical switch means, each interposed in a respective one of said electrical conduits in parallel with said first multiple switch means, for selectively permitting or interrupting the flow of electrical current through said conduits; a second pneumatic actuating means connected to said second multiple switch means for moving said second multiple switch means in unison to positions permitting the flow of electrical current through said multiple conduits in response to the exposure of said second pneumatic actuating means to a second gas charge at a pressure above a predetermined pressure level; second biasing means associated with said second pneumatic actuating means and said second multiple switch means for moving said second multiple switch means in unison to positions interrupting the flow of current through said multiple conduits in response to the reduction of the pressure of said second gas charge to below said predetermined pressure level thereof; second gas conduit means extending from compressor to said second pneumatic actuating means in parallel with said first gas conduit means for conveying said second gas charge from said compressor means to said second pneumatic actuating means; second multiple pneumatic overload valve means interposed in series in said second gas conduit means between said second pneumatic actuating means and said compressor means, each of said second pneumatic overload valve means being connected to a respective one of said overload sensing means, for selectively permitting the exposure of said second pneumatic actuating means to said second gas charge at a pressure above said predetermined pressure level thereof in response to the electrical current flow in each of said electrical conduits, as sensed by said multiple overload sensing means, being below said predetermined current flow, or for selectively reducing the pressure of said second gas charge to below said predetermined pressure level thereof in response to the electrical current flow in any one of said electrical conduits, as sensed by any one of said overload sensing means, being greater than said predetermined current flow; and second manually-operable pneumatic valve means interposed in said second gas conduit means between said second pneumatic actuating means and said compressor means and in series with said second multiple overload valve means for selectively permitting the exposure of said second pneumatic actuating means to said second gas charge at a pressure above said predetermined pressure level thereof or reducing the pressure of said second gas charge to below said predetermined pressure level thereof, the portion of said second gas conduit means between said second manually-operable pneumatic valve means and said second pneumatic actuating means being electrically nonconductive.

6. The system of claim 5, further including an interlock valve means interposed in each of said parallel first and second gas conduit means, each said interlock valve means having a first position permitting the exposure of a respective one of said pneumatic actuating means to a respective one of said gas charges at above said predetermined pressure and a second position preventing said exposure, each of said interlock valve means being responsive to the position of the opposite one of said pneumatic actuating means for permitting said exposure when said opposite pneumatic actuating means is not so exposed, and preventing said exposure when said opposite actuating means is so exposed.

* * * * *

UNITED STATES PATENT AND TRADEMARK OFFICE
CERTIFICATE OF CORRECTION

PATENT NO. : 4,050,091
DATED : September 20, 1977
INVENTOR(S) : John H. Goettel

It is certified that error appears in the above–identified patent and that said Letters Patent are hereby corrected as shown below:

line 11    Change "ther" to --their--.

Col. 3,    line 34    Change "manually controlled" to --manually-controlled--.

Col. 4,    line 38    Change "pressure" to --pressures--.

Signed and Sealed this

Twenty-eighth Day of November 1978

[SEAL]

Attest:

RUTH C. MASON
Attesting Officer

DONALD W. BANNER
Commissioner of Patents and Trademarks